United States Patent [19]

Kubisz

[11] 3,997,172
[45] Dec. 14, 1976

[54] RECORD SUPPORT ASSEMBLY FOR A RECORD PLAYER

[75] Inventor: Christopher Krzysztof Kubisz, Swindon, England

[73] Assignee: Plessey Handel und Investments A.G., Gartenstrasse, Switzerland

[22] Filed: July 15, 1975

[21] Appl. No.: 596,116

[30] Foreign Application Priority Data

Aug. 1, 1974 United Kingdom ............ 33975/74

[52] U.S. Cl. .......................................... 274/10 R
[51] Int. Cl.² ...................................... G11B 17/08
[58] Field of Search ................................ 274/10 R

[56] References Cited
UNITED STATES PATENTS

| | | | |
|---|---|---|---|
| 2,490,678 | 12/1949 | Dale | 274/10 R |
| 3,408,081 | 10/1968 | Dennis | 274/39 R |
| 3,493,232 | 2/1970 | Tatter et al. | 274/10 R |
| 3,531,128 | 9/1970 | Say | 274/10 R |

Primary Examiner—Steven L. Stephan
Attorney, Agent, or Firm—Blum, Moscovitz, Friedman & Kaplan

[57] ABSTRACT

A record edge support assembly for a record player which comprises a body having a support surface for a stack of 12 inch records, and a record stabilizer comprising firstly a clip portion adapted to engage the upper surface of the stack of 12 inch records and secondly a support surface adapted to engage the lower surface of a stack of 7 inch records, the record support assembly being such that the record stabilizer is substantially retracted in the body when the clip portion is in a position operative to engage the 12 inch records, and is substantially withdrawn out of the body when the support surface of the record stabilizer is in a position operative to support the 7 inch records.

3 Claims, 5 Drawing Figures

RECORD SUPPORT ASSEMBLY FOR A RECORD PLAYER

This invention relates to a record support assembly for a record player. This invention also relates to a record player including the record support assembly.

In many known record changing mechanisms, a record is released by movement of a pawl in a record spindle disengaging the record from a support step on the spindle. When the record is of 12 inch size, besides the support step on the spindle at the record centre, other means of stabilising the record are necessary. One such means is a side platform which has a clip which lightly clamps records at their edge to prevent them unduly rocking.

It is often desirable to play on the same record player both 12 inch and 7 inch records, the two sizes having become the popular standard. Hitherto it has been necessary to (a) fit a separate extension on the 12 inch platform to provide support for the 7 inch records, (b) knock out the centre hole of the 7 inch record to a standard 1½ inch diameter hole and then play the 7 inch records using an adaptor record spindle of this diameter, thereby obtaining supporting stability, (c) use some other form of stabiliser such as an overarm, with 7 inch records using a standard record spindle, or (d) play each 7 inch record separately by locating it manually on the turntable.

It is an aim of the present invention to enable a large record or a stack of large records or a smaller record or a stack of smaller records (e.g. a stack of 12 inch records or a stack of 7 inch records) to be played in automatic sequence, whilst having the necessary support and stability and without the need to fix separate accessories on to the record player.

Accordingly this invention provides a record edge support assembly for a record player, which comprises (1) a upstanding housing having a fixed support surface for a first record or a first stack of records, and (2) a record stabiliser body adapted to slide up and down in the housing and comprising firstly a clip portion adapted to engage the upper surface of the first record on the first stack of records and secondly a support surface adapted to engage the lower surface of a second smaller record or a second stack of smaller records, the record edge support assembly being such that the record stabiliser body is upstanding and substantially retracted in the housing when the clip portion of the record stabiliser body is in a position operaive to press the first record or the first stack of records against the fixed support surface of the housing, and is substantially withdrawn from the housing when the support surface of the record stabiliser body is in a position operative to support the second smaller record or the second stack of smaller records: the record stabiliser body being such that it is moved to support the second smaller record or the second smaller stack of records by being pulled upwardly out of the housing and then being pivotted downwardly about the top of the housing until it is substantially parallel with the, second smaller record or the second stack of smaller records.

This invention also provides a record edge support assembly for a record player, which comprises (1) an upstanding housing which is channel shaped in cross-section and which has a fixed support surface for a first record or a first stack of records, and (2) a record stabiliser body adapted to slide up and down in the housing and comprising firstly a clip portion adapted to engage the upper surface of the first record or the first stack of records and secondly a support surface which is at right angles to the clip portion and which is adapted to engage the lower surface of a second smaller record or a second stack of smaller records, the record edge support assembly being such that the record stabiliser body is upstanding and substantially retracted by spring means in the housing when the clip portion of the record stabiliser body is in a position operative to press the first record or the first stack of records against the fixed support surface of the housing, and is substantially withdrawn from the housing when the support surface of the record stabiliser body is in a position operative to support the second smaller record or the second stack of smaller records: the record stabiliser body being such that it is moved to support the second smaller record or the second stack of smaller records by being pulled upwardly out of the housing against the force of the spring means and then pivotted downwardly about the top of the housing until it is substantially parallel with the second smaller record or the second stack of smaller records, the spring means then being operative to bias the end of the record stabiliser body remote from its support surface in position on top of the housing.

This invention further provides a record edge support assembly for a record player, which comprises (1) an upstanding housing which is channel shaped in cross-section and which has a fixed support surface for a first record or a first stack of records, and (2) a record stabiliser body adapted to slide up and down in the housing and comprising firstly a clip portion adapted to engage the upper surface of the first record or the first stack of records and secondly a support surface which is at right angles to the clip portion and which is adapted to engage the lower surface of a second smaller record or a second stack of smaller records, the record edge support assembly being such that the record stabiliser body is upstanding and substantially retracted by spring means in the housing when the clip portion of the record stabiliser body is in a position operative to press the first record or the first stack of records against the fixed support surface of the housing, and is substantially withdrawn from the housing when the support surface of the record stabiliser body is in a position operative to support the second smaller record or the second stack of smaller records: the record stabiliser body (A) having a central elongate web projecting outwardly from an elongate backing portion so that the record stabiliser body is T-shaped in cross section; (B) having three pairs of pins on the web, with the first pair of pins being a pair of stop pins which run in grooves in the housing, the second pair of pins being a pair of guide pins and the third pair of pins being a pair of restrictor pins; and (C) being such that it is moved to support the second smaller record or the second smaller stack of records by being pulled upwardly out of the housing against the force of the spring means and then pivotted on the pair of stop pins downwardly about the top of the housing until it is substantially parallel with the second smaller record or the second stack of smaller records, the spring means then being operative to bias the end of the record stabiliser body remote from its support surface in position on top of the housing.

An embodiment of the invention will now be described by way of example and with reference to the accompanying drawings, in which.

Figure 1:
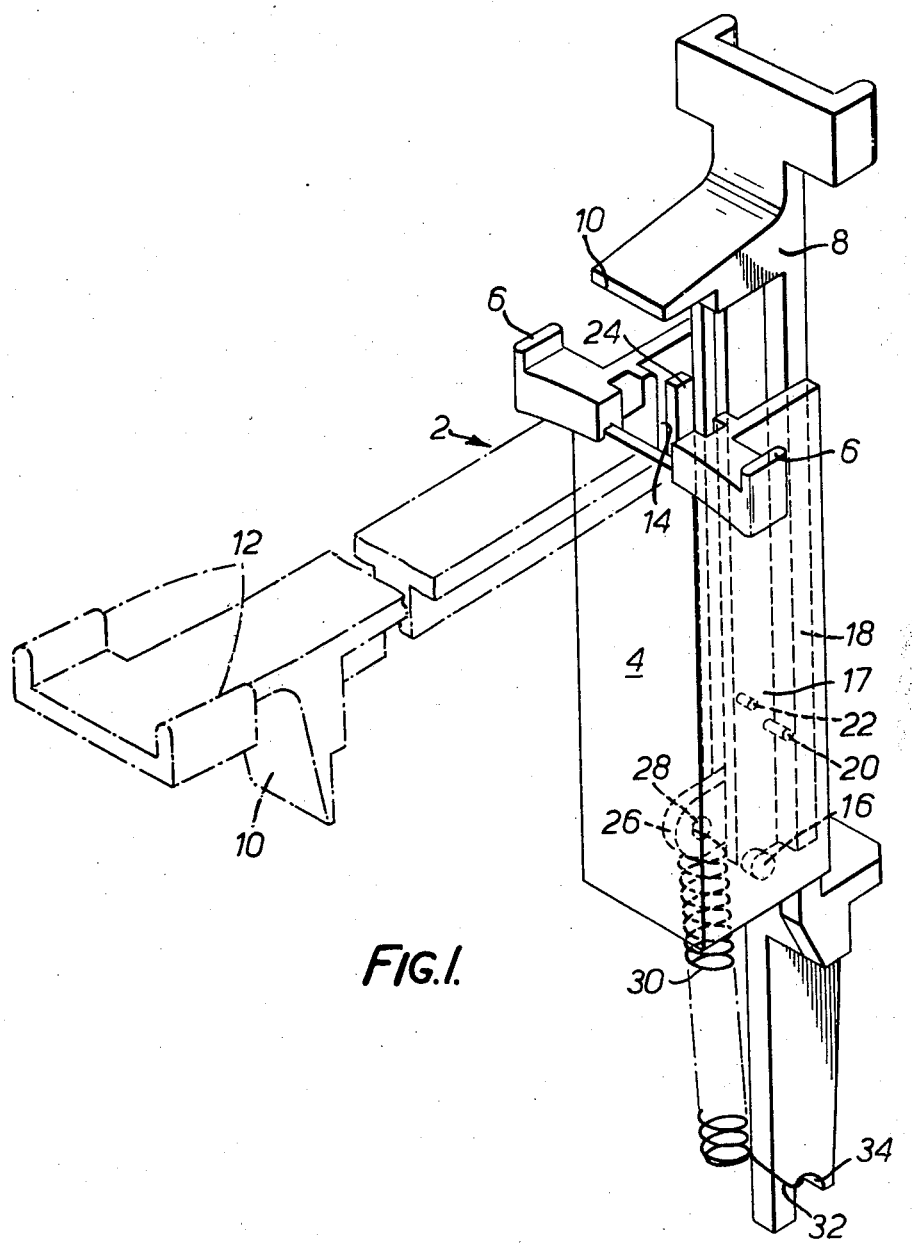
FIG. 1 is a view of a record support assembly in accordance with the invention.

Referring to the drawings, there is shown a record support assembly 2 for a record player (not shown). The record support assembly comprises a body 4 having a support surface 6 for a first record or a first stack of records (not shown and hereinafter referred to as the 12 inch record).

The record support assembly 2 also comprises a record stabiliser 8 comprising a clip portion 10 adapted to engage the upper surface of the 12 inch record, and a support surface 12 for a second smaller record or a second stack of smaller records (not shown and hereinafter referred to as the 7 inch record).

The record support assembly 2 is such that the record stabiliser 8 is substantially retracted within the body 4 when the clip portion 10 is in a position operative to engage the 12 inch record and is substantially withdrawn from the body 4 when the support surface 12 is in a position operative to support the 7 inch record. It will be seen from the drawings that the withdrawal involves moving the record stabiliser 8 upwardly and then pivoting it about the top of the body 4 until it stops in the position shown in FIG. 1.

The body 4 is provided with a groove 14 shown most clearly in FIGS. 2 to 5. The record stabiliser 8 is provided with a pair of stop pins 16 (only one of which is shown) which extend from either side of a central web 17 extending from a backing 18 of the record stabiliser 8 so that the record stabiliser 8 is T-shaped in cross section. Also protruding at right angles from the web 17 of the record stabiliser 8 is a pair of guide pins 20 (only one of which is shown) and a pair of restrictor pins 22 (only one of which is shown). Defining part of one side of each groove or track 14 is an outer guide wall 24. Also attached to the web 17 is a lug 26 (FIG. 1) and the lug 26 is apertured at 28. One end of a spring 30 fits through this aperture 28 and the other end 32 of the spring 30 fits in a recess 34 formed in the bottom of the body 4.

Figure 2:
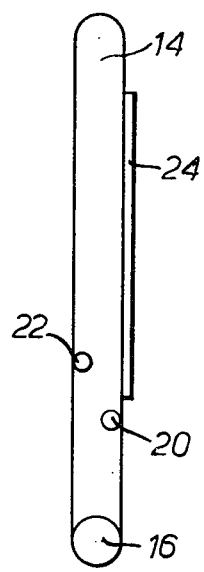
FIG. 2 shows part of the assembly shown in FIG. 1 with the record stabiliser in a not-in-use position.

The tension spring 30 draws the record stabiliser 8 down to the not-in-use position shown in FIG. 2 in which the top of the record clip portion 10 is just below the level of the 12 inch record support surface 6. This enables both hands to be used to load a stack of 12 inch records on the record spindle step (not shown) and on to the record support surface 6.

Figure 3:
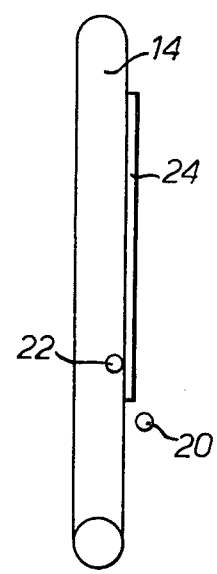
FIG. 3 shows the apparatus of FIG. 2 with the record stabiliser clip moved outwardly to be lifted.
Figure 4:
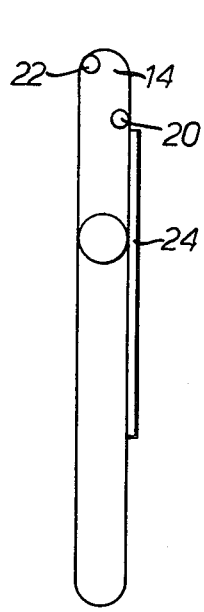
FIG. 4 shows the apparatus of FIG. 2 with the record stabiliser in position for clipping on to a record stack.
Figure 5:
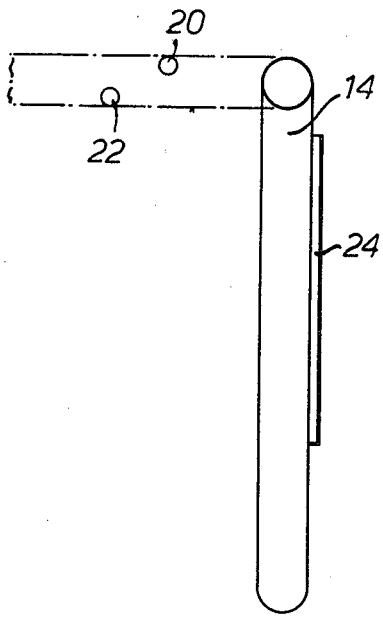
FIG. 5 shows the apparatus of FIG. 2 with the record stabiliser fully lifted and pivoted to form a 7 inch or small record support.

The record stabiliser 8, pivoting about its pair of stop pins 16, is then moved so that the edge of the clip 10 is beyond the edge of the records. With this movement the pair of guide pins take up a position on the outside of the guide wall 24 as shown in FIG. 3. Too much pivoting movement of the record stabiliser 8 is prevent by the pair of restrictor pins 22 meeting the inner face of the guide wall 24.

The record stabiliser 8 can now be lifted so that the clip 10 comes just above the level of the stack of 12 inch records. In this position, the pair of guide pins 20 has moved up just above the top of the guide wall 24 so that when the clip 10 is now moved upwardly towards the centre of the records to overlap the edge of the stack of 12 inch records, the pair of guide pins 20 is moved across the top of the wall 24 to line up with the inside of the guide wall 24, see FIG. 4.

As the stack of 12 inch records are played, the tension spring 30 maintains a stabilising force in lightly sandwiching the edge of the 12 inch records between the clip 10 and the support 6. The inside of the guide wall 24 prevents the pair of guide pins 20 from moving outwardly and thus the clip 10 remains overlapping the edge of the top 12 inch record in the stack of 12 inch records.

The record stabiliser 8 can be lifted upwardly as shown in FIG. 1 with its clip 10 well above the position required to hold a stack of 12 inch records. The stabiliser 8 can be lifted until its pair of stop pins 16 reach the top of the groove 24. At this position, the pair of guide pins 20 and the pair of restrictor pins 22 are clear of the body 4 and the stabiliser 8 can then be pivoted about its stop pins 16, and therefore about the top of the body 4, towards the centre of the turntable (not shown) and along a radius of the turntable. The new pivoted position is shown in dotted lines in FIGS. 1 and 5 and it will be apparent that the body 4 supports the record stabiliser 8 in its new role. The support surface 12 of the record stabiliser 8 which was the back of the 12 inch record clip now acts as a record support surface for the bottom edge of any 7 inch record or stack of 7 inch records on the record spindle step (not shown). The support surface 12 is designed to give adequate 7 inch record stability without the need for an additional record clip such as is required for 12 inch records.

The tension spring 30 pulls the 7 inch record support down on to the top of the body 4 so forming a cantilever structure. However, this cantilever structure is not so rigid as to prevent 7 inch records being lifted clear of the turntable by brushing the support upwards with the edge of the records to give clearance as they are removed from the turntable.

It is to be appreciated that the enbodiment of the invention described above has been given by way of example only and that modifications may be effected. Thus, for example, instead of pairs of pins 16, 20, 22, only one pin of each pair could be employed.

What we claim is:

1. A record edge support assembly for a record player, which comprises (1) an upstanding housing having a fixed support surface for a first record or a first stack of records, and (2) a record stabilizer body adapted to slide up and down in the housing and comprising firstly a clip portion for engaging the upper surface of the first record or the first stack of records, secondly a support surface adapted to engage the lower surface of a second smaller record or a second stack of smaller records and thirdly pivot means for permitting said stabilizer body to be pivoted about the top of said housing, the record edge support assembly being such that the record stabilizer body is upstanding and substantially retracted down into the housing when the clip portion of the record stabilizer body is in a position operative to press the first record or the first stack of records against the fixed support surface of the housing, and is substantially withdrawn up from the housing when the support surface of the record stabilizer body is in a position operative to support the second smaller record or the second stack of smaller records; the record stabilizer body being such that it is moved to support the second smaller record or the second smaller stack of records by being pulled upwardly out of the housing and then being pivoted downwardly about the top of the housing until it is substantially parallel with the second smaller record or the second stack of smaller records.

2. A record edge support assembly for a record player, which comprises (1) an upstanding housing which is channel shaped in cross-section and which has a fixed support surface for a first record or a first stack of records, and (2) a record stabilizer body adapted to slide up and down in the housing and comprising firstly a clip portion for engaging the upper surface of the first record or the first stack of records, secondly a support surface which is at right angles to the clip portion and which is adapted to engage the lower surface of a second smaller record or a second stack of smaller records and thirdly pivot means for permitting said stabilizer body to be pivoted about the top of said housing, the record edge support assembly being such that the record stabilizer body is upstanding and substantially retracted by spring means down into the housing when the clip portion of the record stabilizer body is in a position operative to press the first record or the first stack of records against the fixed support surface of the housing, and is substantially withdrawn up from the housing when the support surface of the record stabilizer body is in a position operative to support the second smaller record or the second stack of smaller records; the record stabilizer body being such that it is moved to support the second smaller record or the second stack of smaller records by being pulled upwardly out of the housing against the force of the spring means and then pivoted downwardly about the top of the housing until it is substantially parallel with the second smaller record or the second stack of smaller records, the spring means then being operative to bias the end of the record stabilizer body remote from its support surface in position on top of the housing.

3. A record edge support assembly for a record player, which comprises (1) an upstanding housing which is channel shaped in cross-section and which has a fixed support surface for a first record or a first stack of records, and (2) a record stabilizer body adapted to slide up and down in the housing and comprising firstly a clip portion for engaging the upper surface of the first record or the first stack of records, and secondly a support surface which is at right angles to the clip portion and which is adapted to engage the lower surface of a second smaller record or second stack of smaller records, the record edge support assembly being such that the record stabilizer body is upstanding and substantially retracted by spring means down into the housing when the clip portion of the record stabilizer body is in a position operative to press the first record or the first stack of records against the fixed support surface of the housing, and is substantially withdrawn up from the housing when the support surface of the record stabilizer body is in a position operative to support the second smaller record or the second stack of smaller records; the record stabilizer body (A) having a central elongate web projecting outwardly from an elongate backing portion so that the record stabilizer body is T-shaped in cross-section; (B) having three pairs of pins on the web, with the first pair of pins being a pair of stop pins which run in grooves in the housing, the second pair of pins being a pair of guide pins and the third pair of pins being a pair of restrictor pins; and (C) being such that it is moved to support the second smaller record or the second smaller stack of records by being pulled upwardly out of the housing against the force of the spring means and then pivoted on the pair of stop pins downwardly about the top of the housing until it is substantially parallel with the second smaller record or the second stack of smaller records, the spring means then being operative to bias the end of the record stabilizer body remote from its support surface in position on top of the housing.

* * * * *